United States Patent
Ukai et al.

[15] 3,652,028
[45] Mar. 28, 1972

[54] WIRE REEL FOR WELDING

[72] Inventors: Jun Ukai; Hisao Sugiyama, both of Nagoya, Japan

[73] Assignee: Mitsubishi Denki Kabushiki Kaisha, Tokyo, Japan

[22] Filed: July 7, 1970

[21] Appl. No.: 52,922

[30] Foreign Application Priority Data

July 9, 1969   Japan....................................44/54323

[52] U.S. Cl..............................................................242/129
[51] Int. Cl............................................................B65h 49/00
[58] Field of Search............................242/128, 129; 314/68

[56] References Cited

UNITED STATES PATENTS 2,188,070   1/1940   Baird et al. ...........................242/129
3,395,308   7/1968   Meyer.....................................314/68

Primary Examiner—Leonard D. Christian
Attorney—Robert E. Burns and Emmanuel J. Lobato

[57] ABSTRACT

The disclosed wire reel comprises side rollers on a supporting disc to be normally maintained in their operative position. Upon loading unloading a coil of welding wire on and from the reel, the rollers are turned through right angles to permit the coil to pass over the disc without any hindrance.

6 Claims, 3 Drawing Figures

PATENTED MAR 28 1972 3,652,028

WIRE REEL FOR WELDING

BACKGROUND OF THE INVENTION

This invention relates to wire reel for welding for use with an automatic continuous arc welding machine and more particularly to means for readily loading and unloading a coil of welding wire on and from such a wire reel.

Previously, it has been generally practiced to load and unload a coil of welding wire on and from a wire reel after the associated components such as a wire keeping plate and a clamping nut have been removed from the main welder body. This could cause the keeping plate to damage and/or the clamping nut to be lost. Also it has been very difficult to load the coil of welding wire on the wire reel.

Accordingly, it is an object of the invention to provide an improved wire reel for welding simple in construction and still readily loading and holding a coil of welding wire thereon as well as easily removing it from the wire reel.

SUMMARY OF THE INVENTION

According to the principles of the invention there is provided a wire reel for welding for use with an arc welding machine comprising a side roller normally maintained in a predetermined operative position to define one end face of a circular coil of welding wire, characterized in that upon loading and unloading the coil of welding wire on and from the wire reel the side roller is moved to its position different from the predetermined operative position.

In a preferred embodiment of the invention, the wire reel for welding may comprise a plurality of side rollers rotatably supported by supporting shafts respectively and normally maintained in their predetermined operative positions where the side rollers define one end face of a coil of welding wire, a support member having a plurality of radial recesses disposed at substantially equal angular intervals on the outer edge portion thereof, a different one of the side rollers being operatively coupled to each of the radial recesses, one casing including an opening and attached to one surface of the support member to enclose each of the radial recesses on the support member, one supporting plate attached to the casing to normally bear each of the supporting shaft for the side roller extending through the associated opening on the casing, and a pivot shaft disposed within each of the casing for rotatably supporting the associated supporting shaft for the side roller, the arrangement being such that upon loading and unloading the coil of welding wire the supporting plates are disabled to bear the support shafts while the side roller are rotated about the axes of the pivot shafts within the interiors of the recesses on the support member.

The supporting plate may be advantageously formed of a leaf spring including a hold into which is fitted one end of the supporting shaft.

The casing each may conveniently have disposed therein a clip means responsive of the operations of loading and unloading the coiled wire on and from the reel to engage the supporting shaft for the side roller to determine a position to which the side roller is rotated.

BRIEF DESCRIPTION OF THE DRAWING

The invention will become more readily apparent from the following detailed description taken in conjunction with the accompanying drawing in which.

DESCRIPTION OF THE PREFERRED EMBODIMENT

Figure 1:
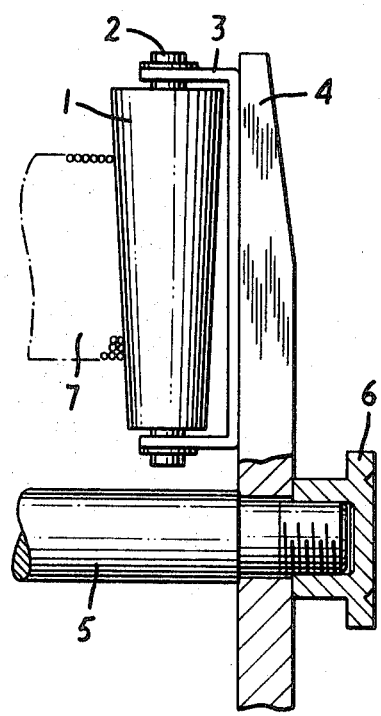
FIG. 1 is a fragmentary side elevation view, partly in section of a wire reel for welding constructed in accordance with the principles of the prior art.

Referring now to FIG. 1 of the drawing it is seen that an arrangement disclosed herein comprises a rotatable side roller 1 supported by a shaft 2, a roller holder 3 of U-shaped cross section attached to a wire keeping plate 4 to rotatably hold the shaft 2 at both ends, and a reel shaft 5 having one end portion extending through the wire keeping plate 4 and engaging a clamping nut 6 with a knob serving to prevent the reel shaft 5 from disengaging from the plate 4. The reel shaft 5 includes the other end portion (not shown) suitably supported by the main body of associated welding machine (not shown). A length of welding wire wound into a circular multilayer coil 7 of self-supported type is shown in FIG. 1 as having one end face abutting against the side roller 1 and includes the other end face defined by a spring loaded plate or like (not shown) suitably supported by the main machine body (not shown).

It will be readily understood that a plurality of the subassemblies formed of the components 1 through 3 are disposed at substantially equal angular intervals on the wire keeping plate 4 to define the one end face of the coil 7.

With the arrangement illustrated, it is required first to release the nut 6 from the reel shaft 5 and then remove the wire keeping plate 4 from the reel shaft 5 in order to load or unload the coil 7 of welding wire. This may cause the keeping wire to damage and/or the nut to be lost. Also it is very difficult to load the coil of wire on the reel.

The invention contemplates to eliminate the disadvantages and difficulty of the prior art type of wire reels as above described.

Figure 2:
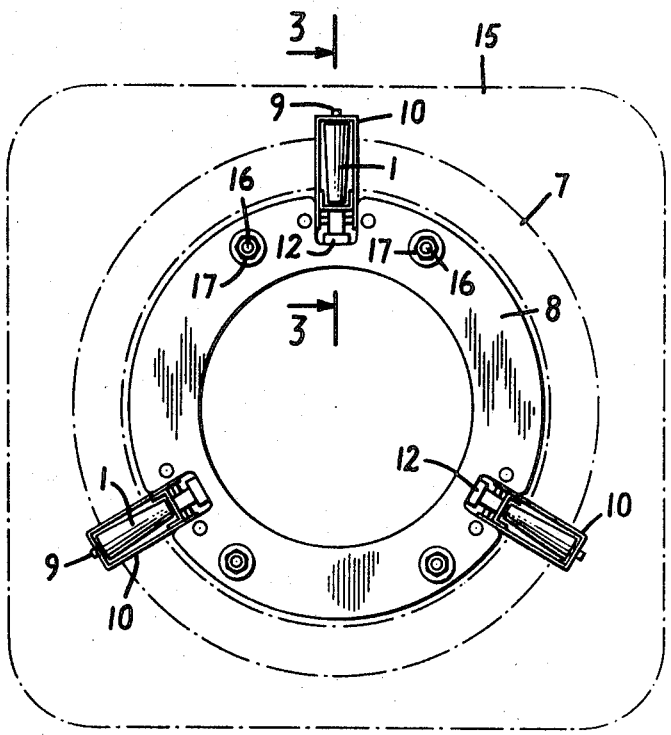
FIG. 2 is a front view of a wire reel for welding constructed in accordance with the principles of the invention with parts illustrated at phantom line.
Figure 3:
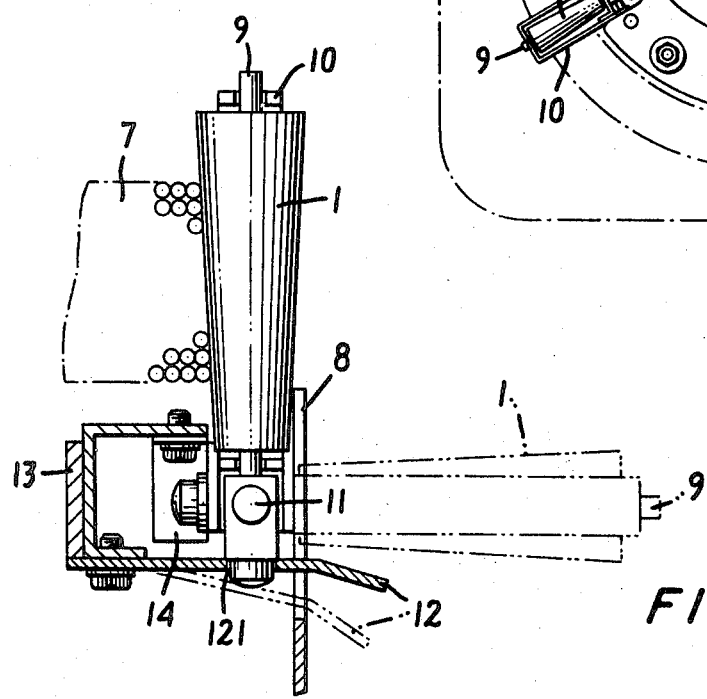
FIG. 3 is a fragmentary section view taken along the line III—III of FIG. 2.

Referring to FIGS. 2 and 3, there is illustrated one embodiment of the invention. The arrangement illustrated comprises a plurality, in this case, three of side rollers 1 disposed at substantially equal angular intervals on a supporting annular disc 8 in the manner as will be subsequently described. Each of the side rollers 1 is rotatably supported by its own shaft 9 through needle bearings (not shown) which shaft 9 is carried by a frame 10. The frame serves to maintain a predetermined axial position of the shaft 9 and therefore of the side roller 1. The lower portion as viewed in FIG. 3 of the shaft 9 increases in diameter and has a stepped pivot pin 11 extending substantially perpendicularly therethrough and rigidly connected to the frame 10 (see FIG. 2). The lower portion as viewed in FIG. 3 of the side roller 1 and the lower enlarged portion of the shaft 9 along with the adjacent portion of the frame 10 are opposite to each of radial notches or recesses provided at substantially equal angular intervals on the outer edge portion of the annular disc 8.

The lower end of the shaft 9 is normally inserted into a hole 121 disposed on a leaf spring 12 as shown at solid line in FIG. 3 to normally maintain the side roller 1 at its predetermined operative position when in its operative position the side roller 1 has its longitudinal axis substantially perpendicular to an axis of a coil 7 of welding wire such as above described in conjunction with FIG. 1 thereby to define the one end face of the coil 7 to prevent turns thereof from being axially separated away from one another. The leaf spring 12 has one end portion extending from the associated recess on the annular disc 8 and the other end connected to a casing 13 fixed to that surface of the disc 8 adjacent the side roller 1 so as to enclose that recess on the disc. Disposed within a casing 13 is a clip 14 serving to maintain the side roller 1 and the associated components in a position illustrated by dot-and-dash lines in FIG. 3 in which they extend through the recess on the disc 8.

In that position, the side roller 1 has its longitudinal axis substantially parallel to the axis of the coil 7.

With the arrangement illustrated the side roller 1 is in rolling contact with the one end face of the coil 7 of the welding wire to permit the welding wire to be smoothly drawn out by any suitable drive (not shown).

If it is desired to load or unload the coil 7 of welding wire on or from the reel as above described then it is required only to rotate the shaft 9 with the side roller 1 from its position illustrated in solid lines to its position illustrated at dot-and-dash line in FIG. 3 with the leaf spring 12 depressed to its position illustrated at dot-and-dash line in FIG. 3. Then the coil can readily be loaded or unloaded on or from the reel because all the side rollers 1 and the associated components are positioned within an extension of the central hole of the coil 7. Thereafter the shaft 9 with the side roller 1 is returned back to its original position whereupon the loading or unloading operation is completed. In order to maintain the coil 7 of welding wire in place on the wire reel, a plurality of turning rollers are disposed in angularly spaced relationship between the annular disc 8 and that wall surface opposing to the disc of a housing for the wire reel. In FIG. 2, the wall surface of the housing is designated at broken round square 15 and the four turning rollers are represented by the ends 16 of shafts therefore connected to the annular disc 8 by nuts 17. Then one spring loaded side roller (not shown) similar to the side roller 1 is suitably connected to the surface 15 in opposite aligned relationship with respect to the side roller 1. From the foregoing it will be appreciated that the loading and unloading of the coil of welding wire can be effected through a series of simple operations without necessity of separating any component from the main body. Therefore there is no fear that any component will be lost. While the invention has been illustrated and described in conjunction with a single preferred embodiment thereof it is to be understood that various changes and modification may be resorted to without departing from the spirit and scope of the invention. For example, instead of the three side rollers, any desired number of the side rollers may be disposed on the supporting annular disc.

What we claim is:

1. In a wire reel for use with an arc welding machine, the combination of a length of welding wire coiled into a hollow cylinder, a side roller normally disposed in a predetermined operative position to define one end face of the coil of welding wire, means for maintaining said side roller in said predetermined operative position, and means responsive to each of the operations of loading and unloading the coil of welding wire on and from the wire reel to move said side roller to a position different from said predetermined operative position.

2. A wire reel for welding as claimed in claim 1 wherein said means for moving said side roller is operative to rotate said side roller to a position substantially parallel to the axis of said coil of welding wire.

3. In a wire reel for use with an arc welding machine, the combination of a length of welding wire coiled into a hollow cylinder, a plurality of side rollers, supporting shafts rotatably supporting the side rollers respectively and normally maintained in predetermined operative positions where the side rollers define one end face of the coil of welding wire, a support member having a plurality of radial recesses disposed at substantially equal angular intervals on the outer edge portion thereof, a different one of said side rollers being operatively coupled to said support member at each of said radial recesses, one casing including an opening and attached to one surface of said support member to enclose each of said radial recesses on the support member, one supporting plate attached to said casing to normally bear each of said supporting shafts for the side rollers extending through the associated opening on the casing, and a pivot shaft disposed within each of said casings for rotatably supporting the associated supporting shaft for a respective side roller, the arrangement being such that upon loading and unloading the coil of welding wire said supporting plates are disabled to bear said support shafts while the side rollers are rotated about the axes of said pivot shafts in the recesses on the support member.

4. A wire reel for welding as claimed in claim 3, wherein said supporting plate is formed as a leaf spring including a hole into which one end of said supporting shaft is fitted.

5. A wire reel for welding as claimed in claim 3, wherein said casing is provided with clip means responsive to each of the operations of loading and unloading on and from the wire reel to engage said supporting shaft for the side roller to determine a position to which the side roller is rotated.

6. A wire reel for welding as claimed in claim 3, wherein said supporting plate is formed of a leaf spring including a hole into which one end of said supporting shaft is fitted and wherein said casing is provided with clip means responsive to each of the operations of loading and unloading on and from the wire reel to engage said supporting shaft for the side roller to determine a position to which the side roller is rotated.

* * * * *